United States Patent [19]
Boyer et al.

[11] 4,244,618
[45] Jan. 13, 1981

[54] PRESSURE FLUID OPERATED GRIPPING APPARATUS

[75] Inventors: Peter W. Boyer; Jonathan D. Dent, both of Fort Wayne, Ind.

[73] Assignee: PHD, Inc., Fort Wayne, Ind.

[21] Appl. No.: 66,567

[22] Filed: Aug. 15, 1979

[51] Int. Cl.³ .............................................. B66C 1/44
[52] U.S. Cl. ........................................ 294/88; 269/34; 269/234; 294/116
[58] Field of Search .................. 294/86.25, 86.3, 88, 294/115, 116; 24/248 E; 269/30, 32, 34, 217, 234; 279/37, 107

[56] References Cited

U.S. PATENT DOCUMENTS

| | | | |
|---|---|---|---|
| 1,801,456 | 4/1931 | Pryor | 294/116 X |
| 2,850,926 | 9/1958 | Jobe | 269/234 |
| 3,396,980 | 8/1968 | Muller | 294/88 X |

FOREIGN PATENT DOCUMENTS 1244439  9/1960  France ..................... 294/116

Primary Examiner—Johnny D. Cherry
Attorney, Agent, or Firm—Gust, Irish, Jeffers & Hoffman

[57] ABSTRACT

Gripping apparatus includes a supporting body having a pair of spaced generally parallel levers independently mounted thereon for pivotal movement toward and away from each other, the respective pivot axes being spaced and parallel. Two elongated cam bars are slidably mounted on the body in parallel juxtaposition with the levers, respectively. The bars are disposed between the pivot axes, respectively, and the body with the axes being opposite the midportions of the bars. Opposed cam devices are provided between the opposite ends of the bars and the respective levers for pivoting the latter oppositely toward and away from each other in response to reciprocal movement of the bars. Means are provided for reciprocating the bars in unison. The body is in the form of a cylinder and the reciprocating means a piston reciprocably received therein. The levers and bars extend longitudinally of the cylinder on diametrically opposite sides thereof.

14 Claims, 10 Drawing Figures

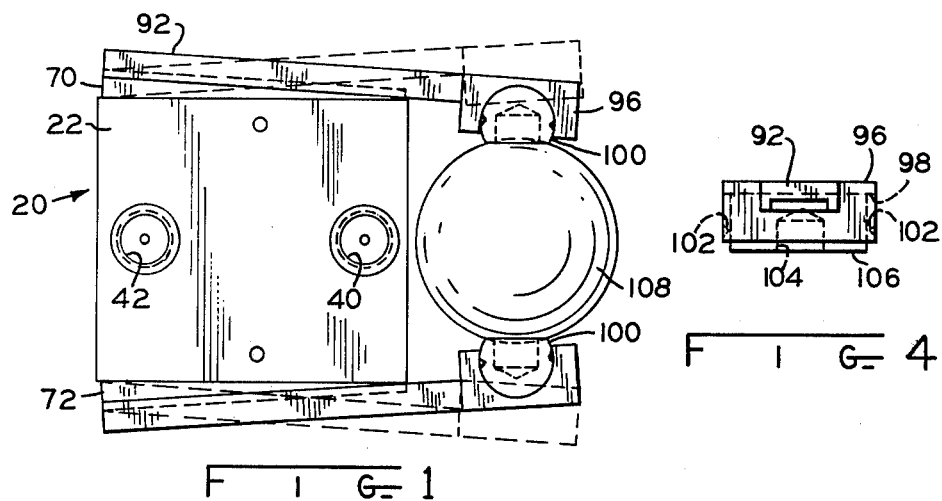
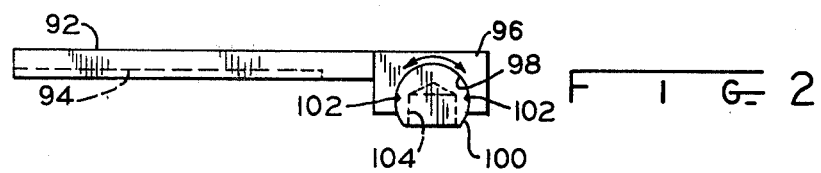
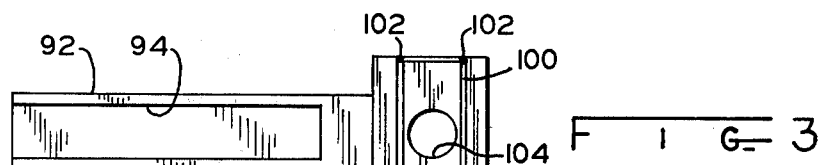
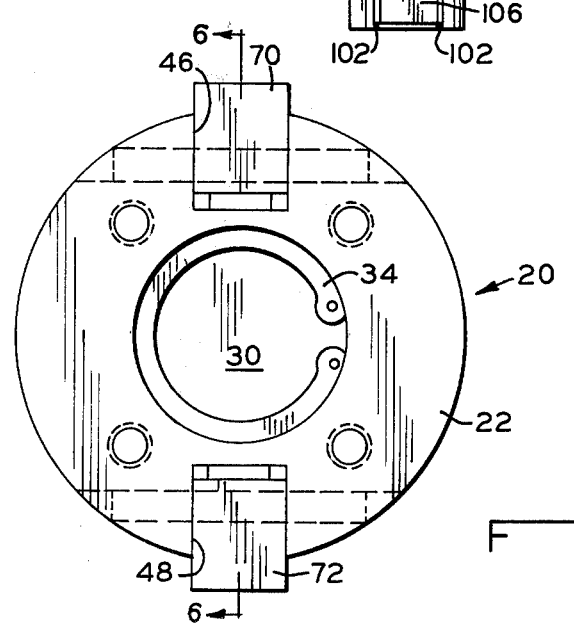

PRESSURE FLUID OPERATED GRIPPING APPARATUS

BACKGROUND OF THE INVENTION

1. Field of the Invention

The present invention relates to pressure fluid operating gripping apparatuses and more particularly to such an apparatus wherein two finger-operated levers are selectively pivoted toward and away from each other by means of wedging or cam bars connected to a pressure fluid operated piston.

2. Description of the Prior Art

Pressure fluid operating grippers are known which include a power cylinder having a piston rod projecting from one end of a cylinder body. Two opposed fingers are pivotally mounted on such cylinder body end for movement toward and away from each other, these fingers having operative connections with the piston rod which extends beyond the same end. Reciprocation of the piston and the piston rod causes the fingers to pivot toward and away from each other.

SUMMARY OF THE INVENTION

The present invention relates to gripping apparatus which includes a supporting body having a pair of spaced, generally parallel levers independently mounted thereon for pivotal movement toward and away from each other, the pivot axes being spaced and parallel. Two elongated operating bars having wedging surfaces are slidably mounted in parallel juxtaposition with the levers, respectively. The bars are disposed between the pivot axes and the body with the axes being opposite the midportions of the bars. Opposed wedging or cam surfaces are provided between the opposite ends of the bars and the respective levers for pivoting the latter oppositely toward and away from each other in response to reciprocable movement of the bars. Means are provided for reciprocating the bars in unison.

In one embodiment of the invention, the body is in the form of a cylinder and the reciprocating means is a piston reciprocably received thereby. The levers and bars extend longitudinally of the cylinder on diametrically opposite sides thereof.

Article-engaging devices may be removably mounted on each of the levers, each of such devices including a swivelable article-engaging pad with the pads on the two levers being juxtaposed for gripping an article therebetween.

It is an object of this invention to provide a pressure fluid operated gripping apparatus having pivotable gripping fingers which may be operated oppositely by means of wedging bars selectively reciprocated by means of a piston mounted in a cylinder body.

It is another object of this invention to provide such a gripping apparatus which is simple in design, economical to manufacture and durable in operation.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

In the drawings,

FIG. 1 is a side view of one embodiment of this invention;

FIG. 2 is a side view of one design of a gripping finger;

FIG. 3 is a bottom view of the gripping finger of FIG. 2;

FIG. 4 is an end view thereof;

FIG. 5 is an end view of the pressure fluid actuator of the apparatus of FIG. 1;

DESCRIPTION OF THE PREFERRED EMBODIMENT

Figure 6:
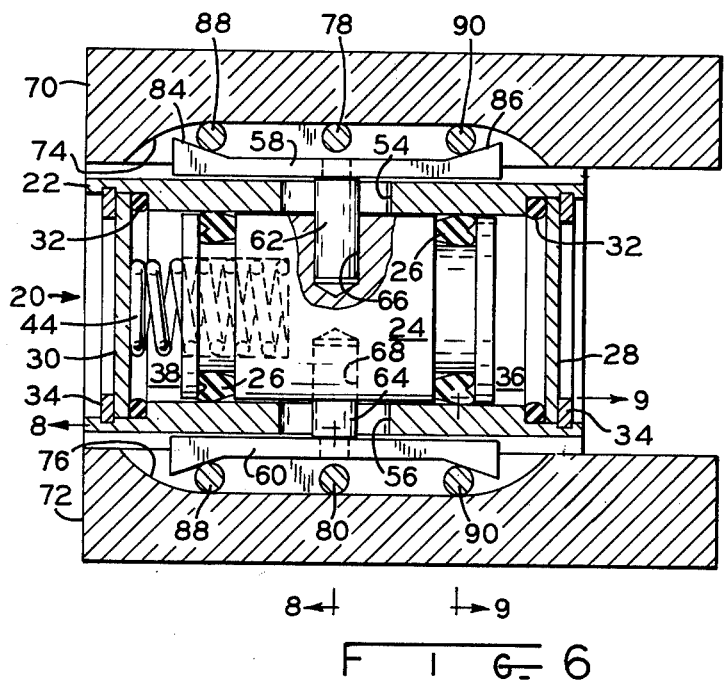
FIG. 6 is a longitudinal sectional view taken substantially along section line 6—6 of FIG. 5.

Referring to the drawings, and more particularly to FIGS. 1, 5 and 6, a pressure fluid actuator generally indicated by the numeral 20 includes an open ended cylinder body 22 which reciprocably receives therein a double ended piston 24. Two seals 26 are provided on the opposite ends of the piston 24, and the cylinder ends are closed by two disc-shaped or wafer caps 28 and 30. These caps 28 and 30 are sealed in the ends of the cylinder 22 by means of rubber O-rings 32, the combination of the end caps 28, 30 and the respective seals 32 being snugly seated within counterbores within the cylinder ends as shown. Snap rings 34 are seated in companion grooves in the opposite ends of the cylinder 22 which retain the end caps 28, 30 in place and also urge the latter against the respective O-rings 32 which are thereby compressed between the radial shoulder of the counterbores and the caps to provide the seals. The piston 24 thus defines two variable volume chambers 36 and 38 within the cylinder and between the end caps 28 and 30, respectively.

Two ports 40 and 42 are provided in the wall of the cylinder body 22 (FIG. 1) for communication with the respective chambers 36 and 38. The actuator just described can thus be made double acting by alternately connecting the ports 40 and 42 to pressure and exhaust. Alternatively, the actuator may be made single acting by use of a helical compression spring 44 seated within a socket in the piston 24 and bearing against the end cap 30. This spring 44 will thus urge the piston 24 toward the right as viewed in FIG. 6 such that when the port 40 is connected to exhaust, the piston 24 will be moved toward its extreme rightward position.

Figure 10:
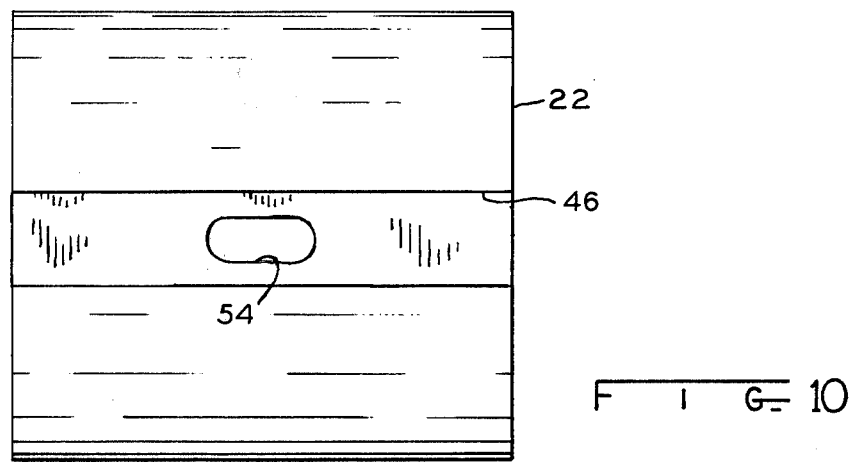
FIG. 10 is a side view of the cylinder body of the actuator of FIGS. 5 and 6.

As is clearly shown in FIGS. 5, 6 and 10, the cylinder body 22 is provided with two longitudinally extending, diametrically opposed grooves 46 and 48 of equal size and shape as shown. In its midportion, the cylinder body 22 is provided with two elongated slots 54 and 56, respectively, on diametrically opposite sides which open through the bottoms of the two grooves 46 and 48 as shown (see for example FIG. 10).

Within the two grooves 46 and 48 are slidably mounted two elongated operating or cam bars 58 and 60, these cam bars being connected to the piston 24 by means of two pins 62 and 64, respectively, which pass through the respective slots 54 and 56 to be snugly received by companion, diametrically aligned, radial bores 66 and 68 in the piston 24. Thus, when the piston 24 reciprocates, the cam bars 58 and 60 will be reciprocated in the respective grooves 46 and 48 in unison.

Two levers of equal size and shape (shown as rectangular in cross-section) are movably received by the respective slots 46 and 48 in overlying relation to the cam bars 58 and 60, respectively. Each of these levers 70 and 72 are provided with longitudinally extending grooves 74 and 76 which receive with sliding clearance portions of the respective cam bars 58 and 60.

The two levers 70 and 72 are pivotally mounted on the cylinder body 22 by means of two pivot pins 78 and 80, respectively, which are spaced apart and parallel and otherwise extend at right angles to the longitudinal axis of the cylinder body 22. The ends of the pins 78 and 80 are received by two bores 82 in the cylinder body 22 which intersect the respective grooves 46 and 48 as shown, these pins 78 and 80 otherwise being disposed radially opposite the centers of the piston 24 and the two cam bars 58 and 60 as well as being opposite the two connecting pins 62 and 64. Further, the cam bars 58 and 60 are disposed between these pivot pins 78 and 80 and the cylinder body 22. So pivoted, the levers 70 and 72 when held in their straight positions as shown in FIG. 6 have clearances with the bottoms of the respective grooves 46 and 48 which permit limited pivoting movement of the levers in opposite directions.

Figure 9:
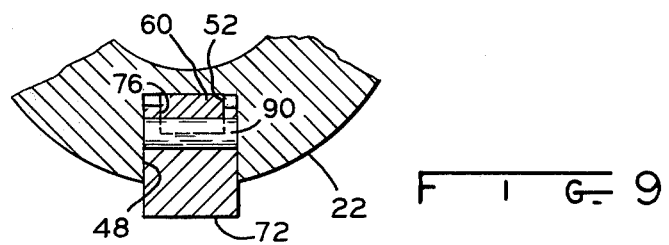
FIG. 9 is a fragmentary cross section taken substantially along section line 9—9 of FIG. 6.

The cam bars 58 and 60 as shown in FIG. 6 are provided on the opposite end portions thereof with outwardly inclined plane surfaces 84 and 86 as shown which are opposed but otherwise symmetrically configured with respect to the center of the cam bar. Each lever 70 and 72 is provided with two spaced apart follower pins 88 and 90 (see FIGS. 6 and 9) which span the respective grooves 74 and 76 in parallelism with the pivot pins 78 and 80, respectively. These pins 88 and 90 are received by companion, transverse bores which extend through the respective levers 70 and 72 and are retained in place by engagement with the opposed walls of the respective grooves 46 and 48. Further, these pins 88 and 90 are so disposed as to engage the respective cam surfaces 84 and 86 at complementary points thereon which will provide the operation to be explained.

Figure 7:
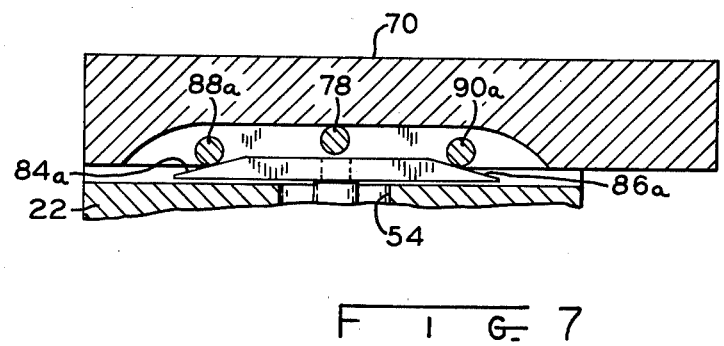
FIG. 7 is a fragmentary longitudinal sectional view of a cam bar design alternative to that shown in FIG. 6.
Figure 8:
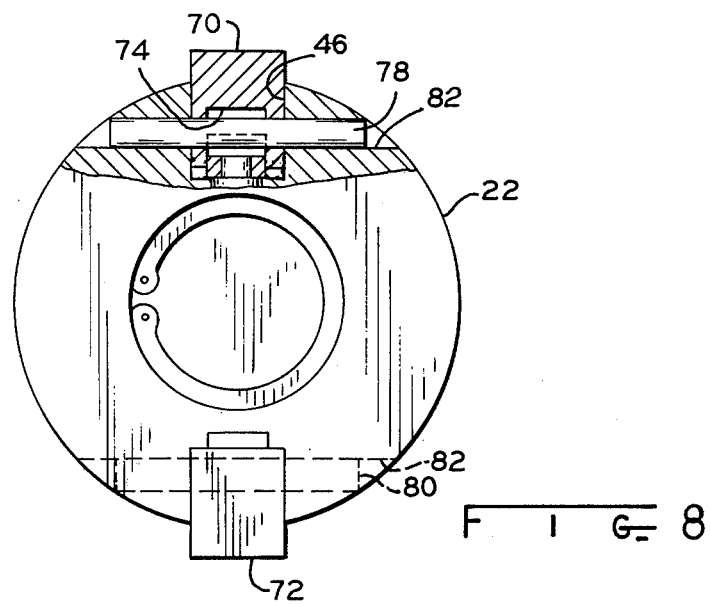
FIG. 8 is an end view of the actuator of FIG. 6 partially sectioned along section line 8—8 thereof.

Reference may now be had to the alternative embodiment of FIG. 7 wherein like numerals indicate like parts and like numerals with the suffix letter "a" indicate similar parts. Essentially, the only difference between this embodiment and the one shown in FIG. 6 is in the shape of the cam bar 58a on which the inclined plane surfaces 84a and 86a extend radially inwardly rather than outwardly. The follower pins 88a and 90a are displaced inwardly on the lever 70 so as to engage complementary portions of these cam surfaces 84a and 86a. Otherwise, the construction is the same and as will appear from the description that follows, the operation is the same except for the lever action being opposite for a given direction of movement of the piston.

In operation, and referring to the embodiment of FIG. 6, pressure fluid admitted to port 40 and the chamber 36 with port 42 connected to exhaust will cause the piston 24 to move toward the left. This carries with it the two pins 62 and 64 and the two cam bars 58 and 60. By reason of the engagement of the inclined plane surfaces on these two bars with the follower pins 88 and 90 on the two levers 70 and 72, the latter will be pivoted about their pins 78 and 80, the lever 70 counterclockwise and the lever 72 clockwise. Moving the piston 24 in the opposite direction results in corresponding movement of the two cam bars 58 and 60 in unison within the grooves 46 and 48 toward the right causing the levers 70 and 72 to pivot oppositely. Since the inclined plane surfaces 84a and 86a in the embodiment of FIG. 7 are the reverse of those of FIG. 6, the fingers 70 and 72 will be pivoted oppositely for a given direction of piston movement 24 as just explained.

Referring once again to FIG. 1 and more particularly to FIGS. 2, 3 and 4, finger attachments for the levers 70 and 72 will be described. Two such finger attachments are used on each actuator. Since they are identically constructed, a description of one will suffice for both. The finger attachment includes an elongated bar 92 slotted at 94 to fit over in snug relation the lever 70. Suitable fastening devices such as screws may be used for securing the finger 92 to the lever 70. On the end of the finger 92 is a rectangular enlargement 96 which is provided with a part cylindrical slot 98. A part cylindrical gripping pad 100 of complementary shape to that of the socket 98 is slidably received by the latter and is locked into place by swaging the opposite ends of the socket 98 as shown at 102. The pad 100 may be provided with a circular indentation 104 and otherwise a flat surface 106 as shown.

With the fingers 92 mounted on the respective levers 70 and 72 as shown in FIG. 1, the piston 24 may be manipulated for the purpose of causing the levers 70 and 72 to pivot such that the pads 100 will be directed toward each other. An article represented by a ball 108 may thereby be gripped between the two pads 100, picked up and moved to another location at which opposite actuation of the piston 24 will cause the levers 70 and 72 to pivot oppositely opening the pads 100 thereby to release the article 108.

Other pad designs may be used without departing from the spirit and scope of this invention, for example, the pad faces 106 may be roughened or serrated to provide for frictional engagement with an article. Alternatively, the pad 100 need not swivel but instead may be a fixed element in the form of the enlargement 98 or a soft, pliable pad of plastic or the like.

While the cam bars 58 and 60 as described are of metal, they alternatively may be of a lubricous plastic in the form of Nylon, Delrin or Teflon (trademarks of E.I. DuPont De Nemours). In order to minimize the indenting of the round follower pins 88, 90 into the plastic surfaces, such pins may be provided with slightly flattened surfaces at the points of engagement with the cam surfaces. This tends to enlarge the area of contact of the pins with the plastic to facilitate the sliding action without undue indenting.

While there have been described above the principles of this invention in connection with specific apparatus, it is to be clearly understood that this description is made only by way of example and not as a limitation to the scope of the invention.

What is claimed is:

1. Gripping apparatus comprising a supporting body, a pair of spaced generally parallel levers independently mounted between the ends thereof on said body for pivotal movement toward and away from each other about spaced parallel axes, two elongated operating bars slidably mounted on said body in parallel juxtaposition with said levers, respectively, said bars being disposed between said pivot axes, respectively, and said body with said axes being opposite the mid portions of said bars, opposed cam means provided between the opposite ends of said bars and the respective levers for pivoting the latter oppositely toward and away from each other in response to reciprocal movement of said bars, and means for reciprocating said bars in unison.

2. The apparatus of claim 1 including article-engaging devices on one end of each of said levers, each said device including a swivelable article-engaging pad, the pads being juxtaposed for gripping an article therebetween.

3. The apparatus of claim 2 wherein said article-engaging devices each include a finger longitudinally slotted to fit over a respective lever, an enlargement on the distal end of each finger, each said pad including a part-cylindrically shaped pin received by a socket of complementary shape in said enlargement, each said pad having an article-engaging portion projecting beyond its enlargement for selective engagement with an article to be gripped.

4. The apparatus of claim 3 wherein said article-engaging portion of each pad includes an indentation.

5. The apparatus of claim 4 wherein said article-engaging portion of each pad includes an irregular surface.

6. The apparatus of claim 1 wherein said body is a cylinder and said reciprocating means is a piston reciprocably received by said cylinder, said levers and bars extending longitudinally of said cylinder on diametrically opposite sides thereof.

7. The apparatus of claim 6 wherein said cylinder is provided with two elongated slots in opposite sides thereof in juxtaposition with said two bars, respectively, two pins being received by said slots and connected between said two bars, respectively, and said piston, said slots accommodating movement of said pins upon reciprocation of said piston.

8. The apparatus of claim 7 wherein said bars are slidably mounted in longitudinally extending grooves in said cylinder.

9. The apparatus of claim 8 wherein said levers are mounted on pivot pins carried by said cylinder, said cam means including longitudinally spaced portions on said bars and levers, respectively, each individual one of said bar portions being operatively engageable with a respective one of said lever portions, the portions on one of said bars and levers being in the form of longitudinally extending inclined planes.

10. The apparatus of claim 9 wherein the portions on said bars are said inclined planes on the ends thereof, said levers having followers thereon which engage said inclined planes, respectively.

11. The apparatus of claim 10 wherein said two levers are received by said grooves, said levers each having a longitudinal groove which slidably receives a respective one of said bars, each lever having two longitudinally spaced followers thereon, each follower being in the form of a pin mounted on the lever which spans transversely the lever groove.

12. The apparatus of claim 11 wherein said inclined planes on said bars angle outwardly from a flat central surface thereof.

13. The apparatus of claim 11 wherein said inclined plane on said bars angle inwardly from a flat control surface thereof.

14. The apparatus of claim 13 wherein said cylinder is provided with opposite open ends which are closed by means of disc-shaped caps seated in respective sockets, retaining rings removably securing said caps in place, said piston with said end caps defining two variable volume chambers, and two ports in the wall of said cylinder in communication with said two chambers, respectively.

* * * * *